UNITED STATES PATENT OFFICE 2,543,281

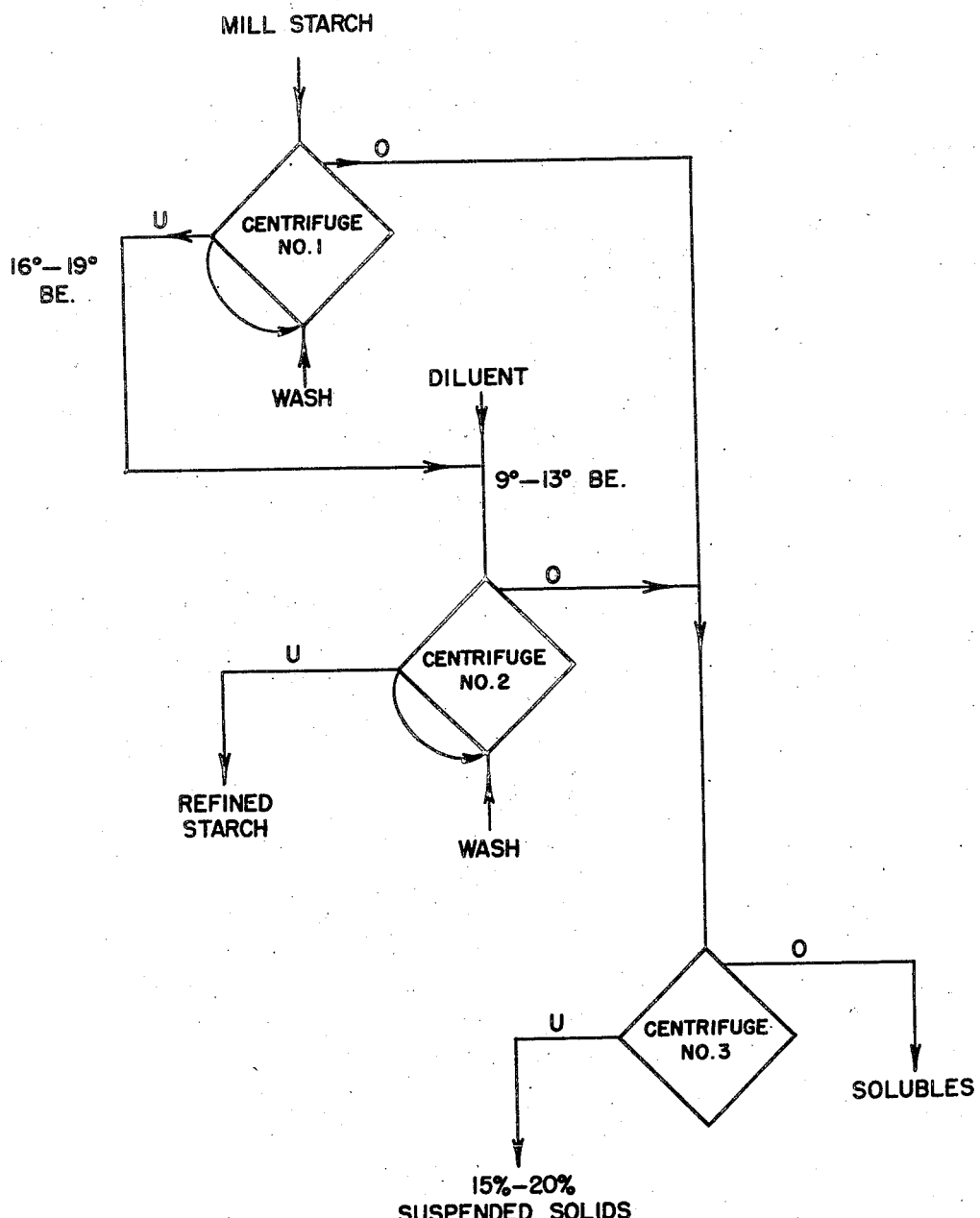

STARCH RECOVERY

Harold Ferrin, Keokuk, Iowa, assignor to General Mills, Inc., a corporation of Delaware Application March 3, 1949, Serial No. 79,363

4 Claims. (Cl. 127—69)

The present invention relates to a process of recovering wheat starch from a wheat starch slurry.

In the production of wheat starch by the wet separation method, the starch is separated from the gluten in the form of a slurry commonly referred to as "mill starch." The separation of the wheat starch from the gluten may be effected by any of the known methods such as washing the dough, mixing a thin batter with water, etc. The manner in which the mill starch is prepared is of relatively little importance insofar as the present invention is concerned. As a general rule, the mill starch from any of these processes is obtained in the form of a 4 to 7 Baumé slurry. Insofar as the present invention is concerned, the gravity of the mill starch is not critical and may be below 4 or greater than 7. However, inasmuch as mill starches are commonly within this range of 4 to 7 Baumé, it will be described with particular reference to such a mill starch.

In wet separation processes the starch is subject to fermentation from the moment the wheat product from which it is derived is first mixed with water, and the fermentation continues until such time as the starch is recovered and dried. It is desirable, therefore, to maintain at a minimum the period of time in which the starch is contacted with water. In wet separation processes the quantity of water employed is also a major factor. In many instances water may not be readily available in quantity and its cost may be high. Furthermore, the wash water employed in starch processes usually cannot be dumped into streams because of the stream pollution problem. It is usually necessary that the wash water be treated to render it harmless before being introduced into the streams, or it may be necessary in some instances to completely dry the wash water and recover dry solids. In any event, it is desirable to maintain the quantity of wash water to a minimum.

Another problem in the recovery of starch is the preparation of a pure starch product. Wheat starch conventionally contains starch granules in varying sizes. The mill starch will be found to contain both large and small starch granules as well as some broken starch granules. In addition to the starch components, the slurry will be found to contain substantial quantities of fiber and possibly small traces of gluten. The production of a relatively pure starch from such a slurry has been a difficult problem when considered in the light of the other problems involved in the processes.

The present invention provides a simple process which results in the production of a high grade starch in a short period of time with the use of a small quantity of wash water and by the use of equipment which occupies only a small floor space.

It is therefore an object of the present invention to provide a novel process of recovering wheat starch from a starch slurry.

The invention will be described with particular reference to the drawing which illustrates diagrammatically a flow sheet for the recovery of wheat starch from a typical mill starch.

The incoming mill starch is first fed into centrifuge No. 1. This centrifuge is preferably of the type described in U. S. Patent No. 1,923,455. This centrifuge provides for the continuous discharge of concentrated solids, as well as the continuous discharge of the liquid overflow. In addition, part of the concentrated solids is internally recycled within the centrifuge and assists in perfecting the separation in the centrifuge. Likewise this machine provides for the introduction of wash water into the centrifuge which is usually mixed with the internally recycled concentrated solids. In the drawing the centrifuge is illustrated as a square, and for simplicity purposes the feed is shown as entering the top of the centrifuge. The concentrated solids or underflow are indicated by the letter U, while the light effluent or overflow is indicated by the letter O. Wash water is shown being introduced opposite the feed and the internally recycled concentrated solids are shown being introduced at the same point as the wash water.

By regulating the amount of underflow withdrawn from the machine, the density of the slurry within the machine can be raised to the point where the overflow contains in addition to water, the fibrous material normally present in mill starch. This is generally referred to simply as fiber. It has been found that when the density of the slurry internally recycled within the machine has been raised to a point usually between 16 and 19 Baumé, an overflow can be obtained which contains a high percentage of the fiber, but little or no starch. When this point is reached the underflow will contain substantially all of the starch granules and the remainder of the fiber, the amount of fiber being relatively small. If no wash water is introduced into this first centrifuge, the solubles present in the incoming mill starch will be distributed in the overflow and underflow in direct proportion to the amounts of water in these two streams. If a refined starch containing a minimum of solubles is desired from this system, the addition of a wash water to the No. 1 centrifuge has been found to be of assistance. This wash water can be either fresh water, or can be from some stream recycled from elsewhere in the refining process, or from some portion of the remaining refining process or milling process. It should not, of course, contain a high percentage of solubles if it is to be effective to reduce the soluble content of the underflow.

The regulation of the No. 1 centrifuge for the production of a 16 to 19 Baumé underflow can be accomplished in either of two ways. First, test tube samples of both the underflow and overflow can be spun in a small laboratory-type test centrifuge. When the No. 1 centrifuge is first started into operation, it will be observed that the amount of fiber in the overflow increases as the density of the slurry within the machine increases. By observing both the overflow and underflow, it will be found that a point will soon be reached where the overflow contains a maximum concentration of fiber with little or no starch. This is the optimum operating condition. The valve regulating the amount of underflow withdrawn from the internal recycle can now be regulated to maintain operation at this optimum condition. After this point has been reached, regulation can be continued in the same manner or the machine can be run to give an underflow of the same constant gravity found at optimum conditions. This can be measured conveniently with an ordinary Baumé spindle or other hydrometer. Minor adjustments in the operation of the machine can be made by a skilled operator after visual examination of the discharge streams.

The underflow from the No. 1 centrifuge, which generally has a gravity in the range of 16 to 19 Baumé, is then diluted down to a Baumé of 9 to 13°, after which it is sent to a second centrifuge which may be of the same type as the first. For this operation a Baumé of 12° has been found quite satisfactory. The diluent for attaining this gravity can be either fresh water or a stream obtained from elsewhere in this process, from any other refining process, or from the milling process. Dilution of the No. 1 underflow down to this range has been found to result in easier and more efficient operation of the No. 2 centrifuge. The second centrifuge is operated to yield an essentially pure starch containing little or no fiber. To this end the second centrifuge is operated such that practically all of the fiber and a small quantity of the starch pass over in the overflow, while an essentially pure starch is discharged in the underflow. This may be attained in a manner somewhat analogous to the operation of the first centrifuge with the exception that in this operation the underflow is the stream observed more carefully. By observation of test samples subjected to laboratory centrifugation, it is found that as the density of the slurry within the second centrifuge is raised, that the underflow contains smaller and smaller quantities of fiber and other non-starch material. As the quantity of fiber in the underflow is decreased, the quantity of starch being discharged in the overflow is increased. At some point, it will be found that the underflow contains the grade of starch desired. Usually this occurs within a Baumé range of 17 to 21°. Maintenance of the centrifuge in this condition is obtained by both observing the density of the underflow with a hydrometer and by observing the material centrifuged out in test tubes with a small laboratory-type centrifuge. Observation of the material in the test tubes shows that generally the starch centrifuges out at the bottom and the non-starch material at the top. By observing the thickness of the upper layer the amount of non-starch material in the underflow can be judged and the machine adjusted to yield whatever purity of starch is desired. Control of the No. 2 centrifuge at this purity can be obtained by observing the density of the underflow and occasionally observing samples in the test centrifuge.

If a refined starch relatively free from solubles is desired, addition of a wash water to the No. 2 centrifuge will be of assistance. This wash water may be either fresh water, or may be a stream obtained from some other portion of the process which contains a smaller concentration of solubles than is desired in the underflow. The rate of addition of the wash water can be adjusted to yield an underflow containing the desired concentration of solubles. It has also been found that the addition of the wash water assists in separating out the non-starch material so that it does not find its way into the overflow. The overflow from either the No. 1 or the No. 2 centrifuge alone or the combined overflows from these two centrifuges can be fed to a third centrifuge for further separation. In the flow sheet the overflow from the No. 1 centrifuge is combined with the overflow from the second centrifuge to form the feed for the No. 3 centrifuge. The purpose of this centrifuge is to make a separation between the solubles and the suspended solids and to concentrate the stream containing the suspended solids. If no washing is accomplished in the third centrifuge the water in the underflow product will contain the same concentration of solubles that the water in the feed carries. If it is desired that the underflow from the third centrifuge contain a smaller quantity of solubles, it is possible to introduce wash water into this centrifuge. For this purpose it is usually advantageous to employ a centrifuge where the wash water can be introduced at a point different from the feed to obtain a more efficient washing action. For this purpose the third centrifuge may be the same as No. 1 and No. 2, and may be operated to yield an overflow containing practically no suspended solids. The underflow contains substantially all the suspended solids and may be at a concentration within a range which is suitable for further processing of this underflow. It may be dried to produce a second grade of starch, or may be further concentrated as desired. Operation of the third centrifuge to produce an underflow containing 15% to 20% suspended solids yields very good results. The overflow can be used as a source of water for other portions of the process, or can be concentrated to recover its solubles content.

The most important part of the process is the operation of the first centrifuge to remove as much of the fiber as possible in the overflow without any loss of starch in that stream, and to recover essentially all the starch in the underflow together with whatever fiber accompanies the starch in that operation. This underflow is then diluted and passed through a second centrifuge which is operated to remove an underflow containing refined starch and essentially no fiber, and to remove an overflow containing substantially all the fiber contained in the first underflow, together with whatever starch necessarily accompanies the fiber. Usually the first underflow has a Baumé of 16 to 19°, while that of the second underflow is from 17 to 21°. The operation of the second centrifuge may be varied somewhat depending upon whether or not it is desired to utilize the starch recovered from that underflow directly, or whether that recovered starch is subjected to further purification. If a more highly refined starch than that in the No. 2 underflow is desired, further centrifuges can be added of the same type. In this case the underflow from the No. 2 centrifuge becomes the feed for a No. 4 centrifuge in the same manner that the underflow from the No. 1 centrifuge becomes the feed for the No. 2 centrifuge. Here again, dilution of the feed down to 9 to 13° Baumé is desirable but is not always essential.

It is apparent from the above description that the present process provides a simple and efficient means for effecting the separation and purification of wheat starch from a mill starch stream. The processing time involved is extremely small, even where small surge tanks are provided for the feed to each of the centrifuges. The length of time between the entry of the mill starch into the process and the discharge of the refined starch is short and the quantities of starch retained on hand for processing are small. Therefore the growth of microorganisms within the slurry is held to a minimum. By carefully choosing the streams used as wash water the amount of recycle within this process and from other portions of the starch process can be kept to zero or at whatever level is desired. This is advantageous in that water can be conserved as necessary and the amount of inoculation of the slurries by microorganisms from elsewhere in the process can be easily controlled. The amount of equipment and the floor space occupied thereby are small. It will be seen therefore that the present invention provides a simple and economical process of producing a pure starch product from mill starch, together with the recovery of secondary starch and other suspended solids as a by-product, and the recovery of solubles in a stream that can be easily concentrated by conventional methods.

Various modifications of the invention have been described. It is to be understood, however, that other variations are possible without departing from the spirit of the invention.

I claim as my invention:

1. Process of separating wheat starch from wheat mill starch containing small traces of gluten, which comprises subjecting the mill starch to centrifugal separation, taking off an underflow having a gravity within the approximate range of 16–19° Baumé, diluting this underflow to a gravity from 9–13° Baumé, and subjecting the underflow to a second centrifugal separation, and taking off an underflow having a gravity of from 17–21° Baumé and which is substantially free from fiber, and an overflow containing fiber and a small amount of starch.

2. Process of separating wheat starch from wheat mill starch containing small traces of gluten, which comprises subjecting the mill starch to a first centrifugal separation, taking off the first underflow having a gravity within the approximate range of 16–19° Baumé, and containing substantially all the starch in the mill starch, taking off a first overflow from the first centrifugal separation, diluting the first underflow to a gravity of 9–13° Baumé, subjecting the diluted underflow to a second centrifugal separation, taking off a second underflow having a gravity within the approximate range of 17–21° Baumé, and being substantially free from fiber, taking off a second overflow, mixing the first and second overflows and recovering suspended solid from the mixed overflows.

3. Process of separating wheat starch from wheat mill starch containing small traces of gluten, which comprises subjecting mill starch to a first centrifugal separation, taking off an underflow with a gravity within the approximate range of 16–19° Baumé and containing substantially all the starch in the mill starch, diluting the first underflow to a gravity within the approximate range of 9–13° Baumé, subjecting the diluted underflow to a second centrifugal separation, taking off an underflow having a gravity within the approximate range of 17–21° Baumé and being substantially free from fiber, and a second overflow containing fiber and starch, and subjecting the second overflow to a third centrifugal separation for the recovery of solids suspended therein.

4. Process according to claim 3 in which the underflow from the third centrifugal separation contains from 15–20% suspended solids.

HAROLD FERRIN.

REFERENCES CITED

The following references are of record in the file of this patent:

UNITED STATES PATENTS

| Number | Name | Date |
|---|---|---|
| 2,013,668 | Peltzer | Sept. 10, 1935 |
| 2,097,531 | Peltzer | Nov. 2, 1937 |
| 2,115,171 | Kelling | Apr. 26, 1938 |
| 2,186,037 | Peltzer | Jan. 9, 1940 |
| 2,310,651 | Peltzer | Feb. 9, 1943 |
| 2,316,807 | Peltzer | Apr. 20, 1943 |
| 2,323,077 | Peltzer | June 29, 1943 |
| 2,418,621 | Callaghan | Apr. 8, 1947 |
| 2,437,036 | Murer et al. | Mar. 2, 1948 |
| 2,488,747 | Strezynski | Nov. 22, 1949 |